United States Patent
Hilpert et al.

(10) Patent No.: US 11,206,810 B2
(45) Date of Patent: Dec. 28, 2021

(54) ANIMAL IDENTIFICATION SYSTEM COMPRISING AN ANIMAL IDENTIFICATION DEVICE AND A SAMPLING MEMBER

(71) Applicant: Allflex Europe, Vitré (FR)

(72) Inventors: Jean-Jacques Hilpert, Vitre (FR); Johan Decaluwe, Laval (FR)

(73) Assignee: ALLFLEX EUROPE, Vitré (FR)

( * ) Notice: Subject to any disclaimer, the term of this patent is extended or adjusted under 35 U.S.C. 154(b) by 608 days.

(21) Appl. No.: 15/500,827

(22) PCT Filed: Jul. 27, 2015

(86) PCT No.: PCT/EP2015/067190
§ 371 (c)(1),
(2) Date: Jan. 31, 2017

(87) PCT Pub. No.: WO2016/016204
PCT Pub. Date: Feb. 4, 2016

(65) Prior Publication Data
US 2017/0215377 A1    Aug. 3, 2017

(30) Foreign Application Priority Data

Jul. 31, 2014  (FR) ...................................... 1457457
Mar. 10, 2015  (FR) ...................................... 1551996

(51) Int. Cl.
*A01K 11/00*    (2006.01)
(52) U.S. Cl.
CPC .......... *A01K 11/003* (2013.01); *A01K 11/004* (2013.01)
(58) Field of Classification Search
CPC .... A01K 11/00; A01K 11/001; A01K 11/003; A01K 11/004; A01K 11/006
(Continued)

(56) References Cited

U.S. PATENT DOCUMENTS 4,470,212 A * 9/1984 Stafford ............... A01K 11/001
                                                40/300
4,597,208 A * 7/1986 Chevillot ............. A01K 11/001
                                                40/301
(Continued)

FOREIGN PATENT DOCUMENTS

DE         20022647 U1     1/2002
EP         0014584 A2      8/1980
(Continued)

OTHER PUBLICATIONS

"Flange" (Collins English Dictionary—Complete & Unabridged 2012 Digital Edition). In Dictionary.com. Retrieved from https://www.dictionary.com/browse/flange (Year: 2012).*
(Continued)

*Primary Examiner* — Daniel L Cerioni
(74) *Attorney, Agent, or Firm* — David D. Brush; Westman, Champlin & Koehler, P.A.

(57) ABSTRACT

The application describes animal identification systems. One animal identification device includes a male part including a shank (12) extending from a support (11) and ending in a locking head (122) intended to be inserted into a female part so as to fix the identification device to an animal, the shank having passing through it a longitudinal canal that allows the passage of the animal tissue sampling member. The shank (12) includes at least one abutment element (13) protruding into the canal, located between the middle of the shank and the distal end of the head (124), the at least one abutment element defining a bearing zone against which at least one bearing element of the sampling member can bear while animal tissue is being sampled. The sampling member includes at least one bearing element that complements the at least one abutment element of the male part.

16 Claims, 4 Drawing Sheets

Figure 1:
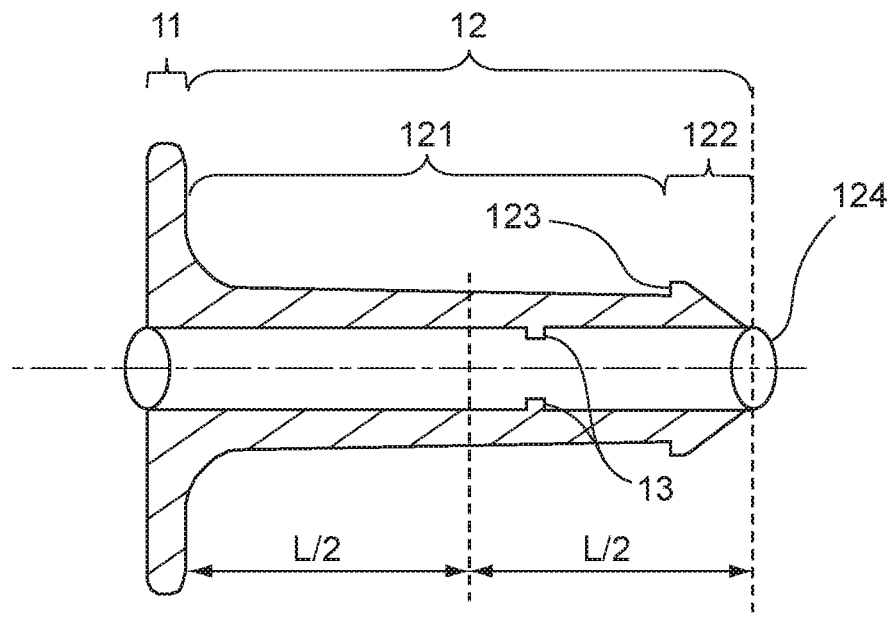

(58) Field of Classification Search
USPC .......................................................... 600/567
See application file for complete search history.

(56) References Cited

U.S. PATENT DOCUMENTS

| | | | | |
|---|---|---|---|---|
| 4,958,452 | A * | 9/1990 | Tate | A01K 11/001 119/655 |
| 6,968,639 | B2 * | 11/2005 | Destoumieux | A01K 11/003 119/858 |
| 7,153,276 | B2 * | 12/2006 | Barker | A61M 25/0631 600/576 |
| 7,895,776 | B2 * | 3/2011 | Costantini | A01K 11/001 40/301 |
| 2004/0103567 | A1 * | 6/2004 | Destoumieux | A01K 11/003 40/301 |
| 2005/0228310 | A1 * | 10/2005 | Pfistershammer | A01K 11/002 600/567 |
| 2010/0016758 | A1 * | 1/2010 | Hilpert | A01K 11/003 600/567 |
| 2010/0286556 | A1 * | 11/2010 | Decaluwe | A01K 11/003 600/567 |
| 2010/0325926 | A1 * | 12/2010 | Hilpert | A01K 11/001 40/301 |
| 2012/0016263 | A1 * | 1/2012 | Hilpert | A01K 11/003 600/567 |

FOREIGN PATENT DOCUMENTS

| | | |
|---|---|---|
| FR | 2929804 A1 | 10/2009 |
| JP | 2010119333 A | 6/2010 |
| WO | 2002080661 A1 | 10/2002 |
| WO | 2003037075 A1 | 5/2003 |
| WO | 2011154510 A1 | 12/2011 |
| WO | 2016016204 A1 | 2/2016 |

OTHER PUBLICATIONS

International Preliminary Report on Patentability for International Application No. PCT/EP2015/067190, completed Jan. 31, 2017, 12 Pgs.

International Search Report for International Application No. PCT/EP2015/067190, Search completed Oct. 23, 2015, dated Nov. 2, 2015, 8 Pgs.

Preliminary Search Report for French National registration No. 1457457, Search completed on Mar. 17, 2015, 13 pages.

Written Opinion for International Application No. PCT/EP2015/067190, Search dated Nov. 2, 2015, 10 Pgs.

Korean Notice of Reason for Rejection dated Oct. 26, 2021 for related Korean Application No. 10-2017-7001692.

\* cited by examiner

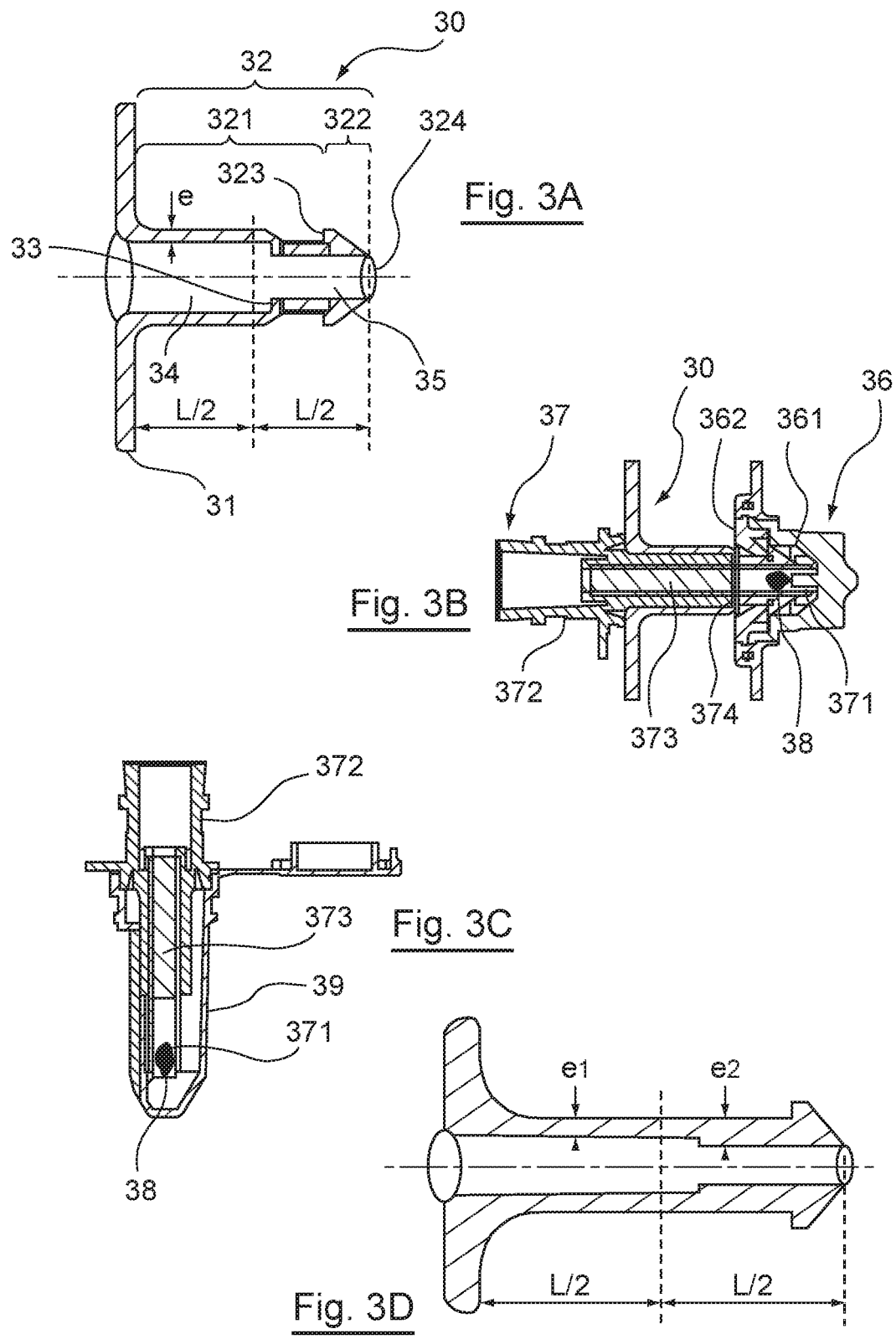

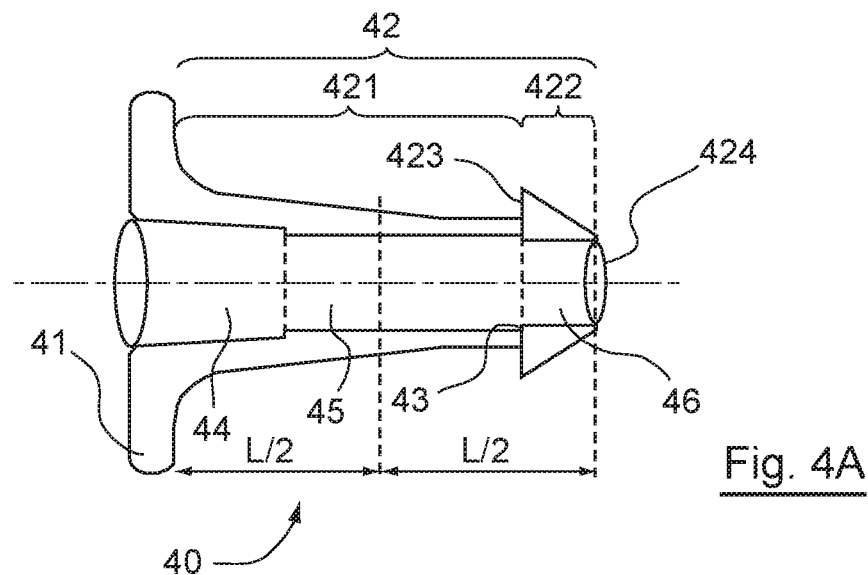
Fig. 4A
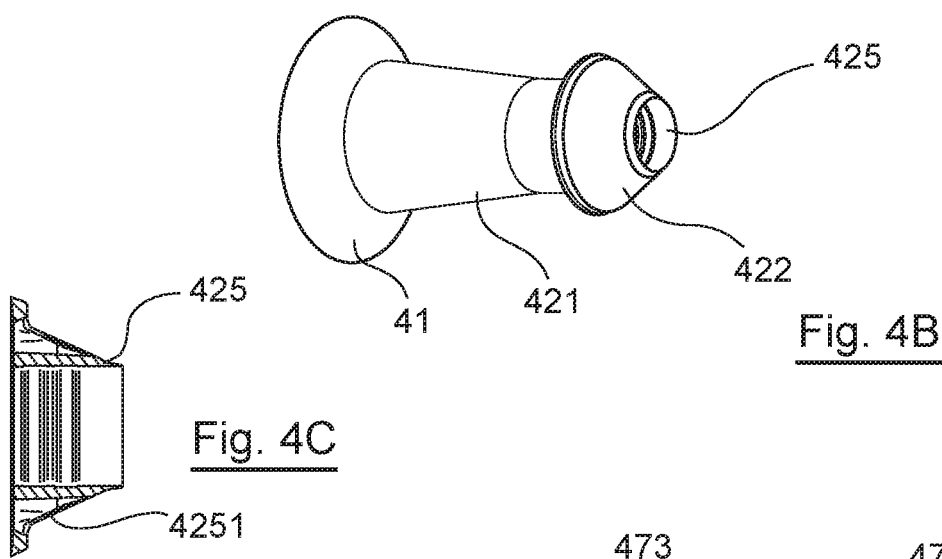
Fig. 4B
Fig. 4C
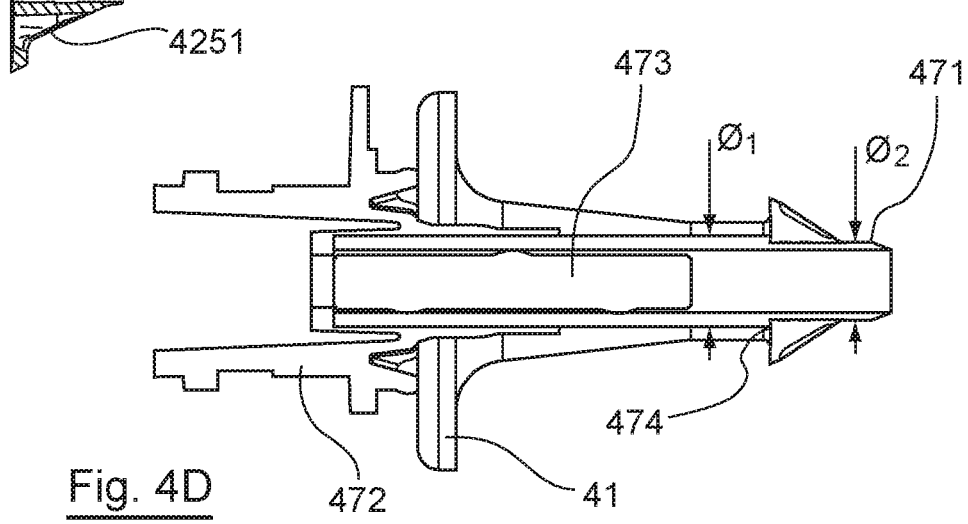
Fig. 4D

ANIMAL IDENTIFICATION SYSTEM COMPRISING AN ANIMAL IDENTIFICATION DEVICE AND A SAMPLING MEMBER

CROSS-REFERENCE TO RELATED APPLICATIONS

The current application is a 35 U.S.C. § 371 National Stage Patent Application of PCT Patent Application Serial No. PCT/EP2015/067190 entitled "ANIMAL IDENTIFICATION SYSTEM COMPRISING AN ANIMAL IDENTIFICATION DEVICE AND A SAMPLING MEMBER" by Hilpert et al., filed Jul. 27, 2015, which application claims priority to French Patent Application Serial No. 1457457, filed Jul. 31, 2014 and to French Patent Application Serial No. 1551996, filed Mar. 10, 2015. The disclosures of PCT/EP2015/067190, French Patent Application No. 1457457, and French Patent Application No. 1551996 are hereby incorporated by reference in their entirety.

1. FIELD OF THE INVENTION

The field of the invention is that of the identifying and/or tagging of animals.

More specifically, the invention relates to a system for identifying animals that can be used to place a visual and/or electronic identification tag on any animal species and take a sample of tissue from the animal.

In particular, the invention relates to the male part of an animal identification tag also called an animal identification device comprising a longitudinal through channel enabling the passage of a tissue sample-taking member.

By thus taking tissue samples, it is possible especially to preserve cells/tissues carrying the animal's biological or biochemical characteristics, for example to subsequently identify the animal or detect illness in the animal.

2. PRIOR ART

In order especially to improve the tracking of livestock, improve productivity (by eliminating diseased animals or searching for singular genetic characteristics for example), and/or guarantee the origin of animals intended for consumption (for example by detecting illnesses) it is increasingly becoming the practice to carry out one or more operations for taking tissue samples from the animals concerned.

Samples can be taken from an animal when placing an identification tag to identify the animal (at birth for example). Other tissue samples can also be taken throughout the animal's existence, for example to detect illness or certify the animal's identity by comparing DNA sequences, or to evaluate its genetic value. Once collected, the sample of animal tissue can be stored and/or transmitted to a laboratory for analysis.

When a sample is taken simultaneously with the placing of the tag, there are known ways of using a male part having an end-to-end through channel used for the passage of a tissue sample-taking member.

According to this example, the male part comprises a shaft extending from a base and ending in a truncatedly conical tip. The shaft (including the truncated tip) is hollow and defines a longitudinal channel, enabling the passage of a sample-taking needle.

This sample-taking needle, fixed to a jaw of the tag-placing or tagging clamp by means of an affixing support, can be withdrawn after the tag has been placed. It has a cutting ridge, generally circular, projecting out of the extremity of the male shaft, so as to perforate the animal's skin when the tag is being placed.

When the tag is being placed, the needle therefore perforates the animal's skin and then guides the tip of the shaft into the cavity of a female part so as to irreversibly join the male and female parts.

Once the tag has been placed, the needle can be withdrawn by making it slide out of the shaft and the tissue sample cut out by the cutting ridge, which has remained in the needle, can be recovered.

These prior art tags are preferably made out of flexible plastic so as to cause the least possible discomfort to the animal in its movements and prevent it from getting injured. The use of deformable material prevents the animal's ear from being torn, which could happen for example when the tag affixed to the animal's ear gets trapped in a fence, a branch, etc.

One drawback of these tags is that the flexibility, which is desirable for the tag, raises problems when the tag is placed and/or when tissue samples are taken. Indeed, the shaft can get deformed when the tag is being positioned, because of the deformable material used. More specifically, the shaft tends to get compressed when the truncatedly conical tip comes into contact with the animal. The shaft gets deformed especially by buckling, thus giving rise to folds. The shaft then has greater difficulty in penetrating the female part at the level of the folds and the inviolability of the tag can then no longer be totally guaranteed. It can also happen that the extremity forming the tip of the shaft does not succeed in penetrating the female part. The tag then becomes unusable. Besides, the folds can interfere with the healing of the animal's ear.

This problem does not exist with tags that do not allow tissue samples to be taken. Indeed, for tags of this type, a thin rod, generally made of metal and fixedly attached to a tag-placing or tagging tool, is inserted into the shaft of the male part of the tag so as to stiffen or rigidify the shaft when the tag is placed.

This approach however cannot be applied to tags having a hollow shaft (i.e. a longitudinal end-to-end through channel) and designed to take tissue samples.

There is therefore a need for a novel type of tag for taking tissue samples that can overcome this problem of deformation of the shaft while causing the least possible discomfort to the animal in its movements and preventing it from getting injured.

3. SUMMARY OF THE INVENTION

The invention proposes a novel solution that does not have all these drawbacks of the prior art, in the form of a male part of an animal-identifying device comprising a shaft or stem extending from a base and ending in a locking head designed to be inserted into a female part to fixedly attach the identification device to an animal.

According to the invention, the shaft is traversed by a longitudinal channel enabling the passage of a sample-taking member for taking animal tissue samples and comprising stiffening means capable of making the shaft rigid along its longitudinal axis. Such stiffening means comprise at least one abutment element protruding into the channel, located between the middle of the shaft and the distal extremity of the head (i.e. opposite the base of the head), the abutment element or elements defining a bearing area on which at least one bearing element of the sample-taking member can take support when a sample of animal tissue is being taken.

The invention thus proposes a novel solution for the male part of the animal identification tags/devices used to take samples of animal tissue and simultaneously place or affix the tag, enabling the tag-placing operation to be optimized.

More specifically, the invention provides for means adapted to stiffening the shaft along its longitudinal axis without impairing its main sample-taking function. Such stiffening means are configured to temporarily prevent a deformation of the shaft along its longitudinal axis, from its locking head towards the shaft base, during the placing of the tag. Such stiffening means comprise at least one abutment element taking for example the form of a toe, a narrowing of the channel etc.

Thus, when the tag is being placed, the invention prevents the shaft from getting deformed by buckling by the creation of folds and bulges around the sample-taking member that is designed to pierce the animal's skin (the skin and the cartilage of the ear for example).

In this way, the injury to the animal can get healed more quickly, since the circulation of air is not hampered by the presence of these folds. In addition, the shaft of the male part can be fitted into the female part on a length sufficient to ensure accurate closure and inviolability of the tag.

According to one particular characteristic of the invention, the body of the shaft is made out of material that is at least partially deformable (for example polyurethane).

The body of the shaft, situated between the base of the shaft and the base of the locking head, therefore gets stiffened only during the tag-placing/tissue-taking operation. Once these operations are finished, the sample-taking member is removed from the shaft of the male part which therefore recovers its flexibility.

The locking head, which conventionally takes the shape of a truncated tip, is preferably made out of a non-deformable material so as to prevent its withdrawal after insertion into the female part.

It can be noted that the base, from which the shaft extends substantially perpendicularly, can also be made out of a material that is at least partially deformable. In this way, the shaft base (which can be of a greater or smaller size) is deformable, thus preventing any tearing of the animal's skin (its ear for example) which might occur when the base gets trapped in a fence, a branch, etc.

According to one particular embodiment, the channel comprises at least two portions having distinct sections, and the abutment element corresponds to the junction area between the portions with distinct sections.

In particular, the portions having distinct sections of the channel are cylindrical and concentric.

The junction area therefore defines a crown-shaped surface area on which at least one bearing element of the sample-taking element can take support to stiffen the body of the male shaft.

In particular, the portion located before the junction area can have a circular section with a diameter greater than that of the portion located after the junction area, going from the shaft base towards the locking head of the male part.

According to this particular embodiment, the thickness of the material forming the body of the shaft at the portions having distinct sections can be substantially constant.

In this way, the external sheath of the male shaft follows the shape of the channel, and the male shaft has at least two portions having distinct sections along its body.

The thickness of the male shaft is therefore substantially constant, between the base from which it extends and the base of the locking head, thus limiting the quantity of material used to make the shaft.

In particular, the distance between the head and the junction area is adapted so that the material forming the body of the shaft at the junction area abuts the base of the female part when the male and female parts are fitted together.

The male shaft thus defines a blocking area between the base of the locking head and the junction area, thus blocking a retaining ring present at the inlet hole of the female part.

Thus, this system ensures a more efficient blocking of the male part in the female part.

As a variant, the thickness of the material forming the body of the shaft at the portion located before the junction area is smaller than the thickness of the material forming the body of the shaft at the portion located after the junction area, going from the shaft base towards the locking head of the male part.

In this way, the body of the male shaft has a shape/external sheathing that is substantially cylindrical.

According to another particular embodiment, the locking head has an insert with a hardness greater than that of the material forming the body of the shaft.

The insert is therefore made out of a non-deformable material so as to prevent the removal of the locking head after it has been inserted into the female part and improve the inviolability of the tag.

As already indicated, the rest of the shaft and/or the shaft base, for their part, can be made out of a deformable material.

In particular, the insert is a truncated cone, a part of the base of this truncated cone defining the junction area.

Such an insert is especially traversed from end to end by the longitudinal channel enabling the passage of a sample-taking member for taking samples of animal tissues.

According to another particular characteristic, the insert comprises at least one recess.

It is thus easy to make the male part, for example by over-molding the shaft (and if necessary the shaft base) on the insert. The material used for the shaft, for example polyurethane, can flow into the recess or recesses of the insert so as to fixedly attach the insert to the rest of the shaft.

In particular, the base from which the shaft extends comprises a marking surface carrying an identifier of the animal. In order to be visible, this marking surface is preferably provided on the face of the shaft base turned towards the exterior, i.e. oriented on the side opposite the male shaft.

For example, such a shaft base can take the form of a disk or comprise an extension defining a substantially rectangular marking surface that is large-sized for cattle, or small-sized for sheep, according to characteristics known to those skilled in the art. Thus, the shaft base can be variably sized, depending on the type of animal on which the tag will be placed.

The identifier of the animal may be a visual identifier, taking for example, the form of an alphanumerical code, a bar code, a matrix, etc. and/or an electronic identifier such as a transponder or the like.

The invention also relates to a sample-taking member capable of being at least partially inserted into the longitudinal channel of the shaft of a male part as described above.

According to the invention, such a sample-taking member comprises at least one bearing element, complementary to the abutment element of the male part.

In particular, the distance between the bearing element and the distal sample-taking extremity of the sample-taking member is defined so that the distal sample-taking extremity projects beyond the shaft of the male part when the bearing element rests against the abutment element.

In other words, the distance between the bearing element and the distal sample-taking extremity of the sample-taking member is slightly greater (by about 2 mm) than the distance between the abutment element and the distal extremity of the locking head of the male part.

It will be noted that such a sample-taking member comprises a sample-taking element of a biopsy needle type, a thin rod that ends in a tip type, or any other element used to take a sample of tissue. The sample-taking distal extremity corresponds to the cutting ridge of the needle, to the extremity of the tip, etc. Here below, such a sample-taking element will be called a "needle".

For example, said bearing element is a ring fixedly attached to the needle of said sample-taking member.

Advantageously, such a member also comprises an affixing support, making it possible to handle the needle and to fixedly attach it to the tag-placing tool for the sample-taking operation.

As the case may be, such a sample-taking member also comprises a pusher element housed in the longitudinal channel of the needle, enabling the sample of tissue to be pushed out of the needle once the sample has been taken.

A bearing element according the invention may be part of the affixing support, one or more studs provided at the level of the needle or the support, an excess thickness of the needle, etc.

In another embodiment, the invention relates to a system for identifying animals, comprising:
- a device for identifying animals comprising:
  - a male part as described above;
  - a female part comprising a cavity designed to receive the locking head of the male part, and
- a sample-taking member as described above.

This system could of course comprise the different characteristics relating to the male part of an identification device according to the invention or the sample-taking member according to the invention, which can be combined or taken in isolation. Thus the characteristics and advantages of this system are the same as those of the male part and of the sample-taking member described here above. They are therefore not described in more ample detail.

4. LIST OF FIGURES

Figure 2:
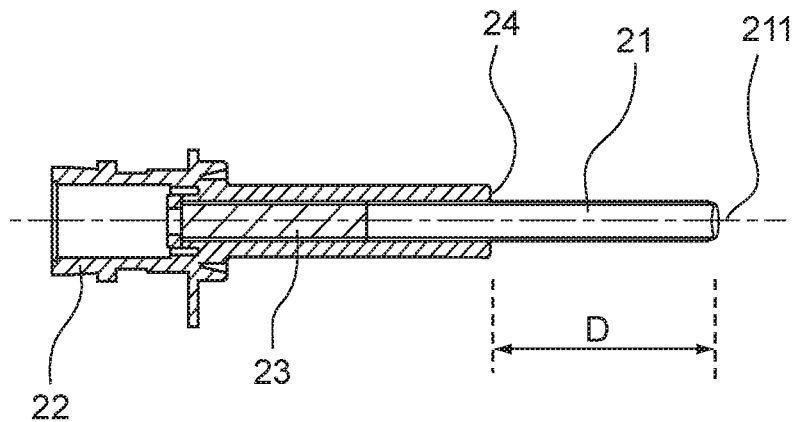

Other features and advantages of the invention shall appear more clearly from the following description of a particular embodiment, given by way of a simple illustrator and non-exhaustive example and from the appended drawings, of which:

FIG. 1 illustrates a first embodiment of a male part of an animal identification device according to the invention;

FIG. 2 presents an example of a sample-taking member designed to be inserted at least partly into a male part according to FIG. 1;

FIGS. 3A to 3D illustrate the different elements of a system for identifying animals according to a second embodiment;

FIGS. 4A to 4F present a male part of a device for identifying animals and a sample-taking member according to a third embodiment of the invention.

5. DESCRIPTION OF ONE EMBODIMENT OF THE INVENTION

The general principle of the invention relies on a temporary stiffening of a male part of a device for identifying animals, used to rigidify or stiffen the shaft of the male part along its longitudinal axis during the operations for taking samples of animal tissue and placing the identification device.

Such stiffening means according to the invention are configured to prevent a deformation of the shaft along its longitudinal axis from the locking head towards the shaft base.

In this way, the shaft of the male part undergoes very little or no deformation when the tag is being placed. This prevents the risks of misfit between the male and female parts and unsatisfactory healing of the ear caused by the presence of "folds" in the shaft.

It can be noted that this stiffening is temporary. In this way, the shaft base and the body of the male part can be made out of a deformable material. Thus, during operations for taking samples of animal tissue/placing the identifcation device, the shaft is reinforced to prevent a deformation of the shaft along its longitudinal axis. Once the tag is placed, the risks of the animal's ear getting torn for example, when the tag gets trapped in a fence or similar place, are prevented because the shaft base or the body of the shaft can easily get deformed under the usual pressures.

Referring to FIG. 1, a first embodiment of a male part according to the invention is presented.

Such a male part comprises a shaft 12 extending perpendicularly (or substantially perpendicularly) from a base 11, designed to rest for example on a first face of an animal's ear. Such a shaft 12 comprises a body 121 and a locking head 122. The body 121 is conventionally cylindrical or frusto-conical. The head 122 classically takes the shape of a truncated tip or of a truncated cone. At its base 123, the head 122 defines a shoulder feature used to secure the head of the male part in a cavity of the female part when the identification device is affixed to the animal.

According to the invention, the shaft 12 is considered to be traversed from end to end by a longitudinal channel enabling the passage of an animal tissue sample-taking member.

According to the invention, the shaft 12 comprises stiffening means used to stiffen it in its longitudinal sense, comprising at least one abutment element protruding into the channel, located between the middle of the shaft and the distal extremity 124 of the head. An abutment element 13 takes for example the shape of a toe defining a bearing area on which at least one bearing element of the sample-taking member can rest when animal tissue samples are being taken.

In this way, a bearing area is defined that is closer to the extremity 124 of the shaft than to the shaft base 11, thus reducing or even eliminating the compression length of the shaft during operations for placing tags/taking samples.

More specifically, if the shaft has a length L between the shaft base 11 and the distal extremity 124 of the head, then the abutment element or elements 13 are situated at equal distance from the shaft base 11 and at a distance from the shaft base 11 at least equal to L/2. Preferably, the abutment element or elements are situated at a maximum distance of L/10 from the distal extremity 124 of the locking head.

In this way it is possible to use a male part made mainly, or even totally, out of a deformable material, thus preventing problems related to the identification tag getting trapped and of the ear getting torn.

The samples can be taken by inserting a sample-taking member as illustrated in FIG. 2 into the longitudinal channel of the male part illustrated in FIG. 1.

For example, such a sample-taking member comprises:
- a sample-taking element 21, for example of the biopsy needle type, intended to perforate the tissue of the animal to take a sample, having a distal extremity 211 that has a generally circular cutting ridge;
- an affixing support 22, for example made out of rigid plastic, enabling the needle to be handled and to be fixedly attached to a jaw of a tag-placing tool for the sample-taking and tag-placing operations;
- as the case may be, a pusher element 23 which can be guided in translation into the needle 21 to push the taken sample out of the needle 21 once the sample has been taken.

According to the invention, such a sample-taking member comprises at least one bearing element 24 complementary to the abutment element 13 of the male part. In particular, the distance D between the bearing element or elements 24 and the distal sample-taking extremity 211 of the sample-taking member is defined so that the distal sample-taking extremity protrudes beyond the shaft 12 when the bearing element or elements 24 rest against the abutment element or elements 13.

In this way, when the tag is being placed and tissue samples are being taken, the sample-taking member can carry out the operations of cutting and retaining tissue. In addition, when the bearing element of the sample-taking member abuts the abutment element of the male part, the sample-taking member transmits a force to the male part enabling the insertion of the locking head 122 into the female part.

Referring to FIGS. 3A to 3C, we now present a second embodiment of the invention.

According to this second embodiment, a male part 30 comprises a shaft 32 extending from a base 31. The shaft comprises a body 321 and a head 322. The longitudinal channel of the shaft 32 comprises two substantially cylindrical and concentric portions 34 and 35, having distinct sections. In particular, the junction area 33 between the portions 34 and 35 having distinct sections defines an abutment element, forming a bearing area in the shaft on which at least one bearing element of the sample-taking member can take support when a sample of animal tissue is being taken.

More specifically, the first portion 34 situated between the shaft base 31 and the junction area 33 has a circular section having a first diameter strictly greater than the second diameter of the second portion 35 situated between the junction area 33 and the distal extremity of the head 324

For example, the first diameter is of the order of 5.6 mm and the second diameter is of the order of 3.6 mm.

The junction area 33 thus defines a crown on which at least one bearing element of the sample-taking member can take support.

Again, if L denotes the total length of the shaft, the junction area 33 between the portions 34 and 35 having distinct sections must be situated at a distance from the shaft base 31 at least equal to L/2. Preferably, the junction area 33 between the portions 34 and 35 having distinct sections is situated at a maximum distance of L/10 from the distal extremity 324 of the head.

In particular, the thickness e of the material forming the body 321 of the shaft at the first and second portions is substantially constant, for example of the order of 1 mm.

In this way, the external sheath of the body 321 of the shaft follows the shape of the longitudinal channel.

In one variant, illustrated in FIG. 3D, the thickness of the material forming the body of the shaft at the portion localized before the junction area, denoted as e1, is smaller than the thickness of the material forming the body of the shaft at the level of the portion located after the junction area, denoted e2 in going from the shaft base to the locking head of the male part.

In this way, the external sheath of the body 321 of the shaft is substantially cylindrical. FIG. 3B provides a more precise illustration of a system of identification according to the invention, comprising a male part 30 as described above, a female part 36 and a sample-taking member 37.

Such a sample-taking member 37 comprises:
- a needle 371 of a biopsy needle type;
- an affixing support 372;
- if necessary, a pusher element 373;
- a bearing element 374.

The female part 36 comprises a reception cap having a cavity 361 to introduce the locking head 322 of the male part 30. In particular, the female part 36 has a retaining ring 362 at the inlet hole of the female part. Such a retaining ring 362 has for example flexible strips used for the insertion of the locking head into the cavity of the female part and preventing its withdrawal.

When the tag is placed and when the sample is taken, the needle 371 perforates the animal's skin along a circumferential contact line and then guides the locking head 322 of the shaft of the male part into the reception cap of the female part so as to fit the male part 30 and the female part 36 together.

The dimensions of the male part 30 are such that when the sample-taking member is inserted into the longitudinal channel and abuts the bearing area defined by the junction area 33 at the bearing element 374, the extremity of the hollow needle 371 protrudes out of the extremity 324 of the shaft 32 so as to cut out tissue from the animal.

In this way, the stiffness of the shaft 32 of the male part is ensured during the operation of taking samples/placing the tag.

In particular, the distance between the locking head (base 323 of the head or distal extremity 324) and the junction area 33 is adapted so that the material forming the body of the shaft at the junction area abuts the base of the female part when the male and female parts are fitted together. The body 321 of the male shaft thus defines a blocking area between the base 323 of the locking head and the junction area 33, making it possible to block the retaining ring 362 and reinforce the inviolability of the tag.

Once the tag has been placed, the sample-taking member 37 can be withdrawn by being made to slide out of the shaft 32 and the tissue sample 38 present in the needle 371 can be recovered.

In particular, as illustrated in FIG. 3C, the needle 371 carrying the tissue sample 38 can be introduced into a sample tube 39. A thin rod (for example a tag-placing tool rod) can push the pusher element 373 so as to extract the tissue sample 38 from the needle 371.

Henceforth, referring to FIGS. 4A to 4F, we present a third embodiment of the invention that can be combined with the embodiments described above.

According to this embodiment, the longitudinal channel of the shaft 42 of the male part 40 has three successive portions 44, 45 and 46 having distinct sections. The first portion 44 has a substantially frusto-conical shape. The second portion 45 and third portion 46 are substantially cylindrical. The three portions 44, 45 and 46 are concentric.

In particular, the junction zone 43 between the second portion 45 and third portion 46 defines an abutment element forming a crown-shaped bearing area in the shaft on which at least one bearing element of the sample-taking member can take support during a sampling of animal tissue.

Such a junction area 43 is located at the base 423 of the locking head, at the junction between the body 421 of the shaft and the head 422 of the shaft. It is therefore located at a distance greater than L/2 relative to the shaft base 41, where L is the total length of the shaft. In other words, the bearing area is located as close as possible to the extremity 424 of the shaft.

More specifically, according to this embodiment, the locking head 422 comprises an insert 425 having a hardness greater than that of the material forming the body 421 of the shaft. For example, such an insert 425 can be a metallic insert or a plastic insert having a hardness of the order of 50 to 70 Shore D, while the body 421 of the shaft and the shaft base 41 have a hardness of the order of 42 to 55 Shore D.

Such an insert 425 takes for example the shape of a truncated cone traversed from end to end by the longitudinal channel. A part of the base of such a cone defines the junction area 43.

In particular, as illustrated in FIG. 4C, such an insert comprises at least one recess 4251 into which the material used to make the shaft can flow during the molding of the male part. In this way, the insert is perfectly attached to the shaft.

In addition, the use of such an insert ensures that the head 422 is properly held in the female part, once the male part is inserted into the female part.

FIG. 4D illustrates a first example of a sample-taking member inserted into the male part 40. Such a sample-taking member comprises:
- a needle 471, of the biopsy needle type;
- an affixing support 472;
- a pusher element 473;
- a bearing element 474.

According to the example illustrated in FIG. 4D, the needle 471 has two cylindrical portions, of which a first portion has a circular section with an external diameter ø1 and a second portion has a circular section of an external diameter ø2, with ø1>ø2. The junction area between the first and second portions defines the bearing element 474.

Such a bearing element 474 is complementary to the abutment element 43 of the male part. The insert 425 therefore creates a rigid shoulder on which the needle can take support.

In particular, the distance D between the bearing element 474 and the distal extremity of the needle 471 is defined in such a way that the distal extremity of the needle 471 protrudes beyond the shaft 42 when the bearing element 474 rests on the abutment element 43.

In this way, the sample-taking member performs the operations for cutting out and retaining tissues during insertion of the locking head 422 into the female part.

Figure 4E:
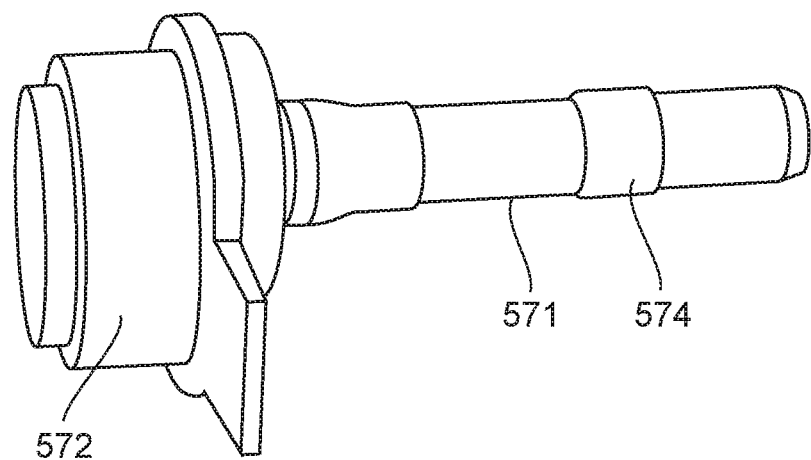
Figure 4F:
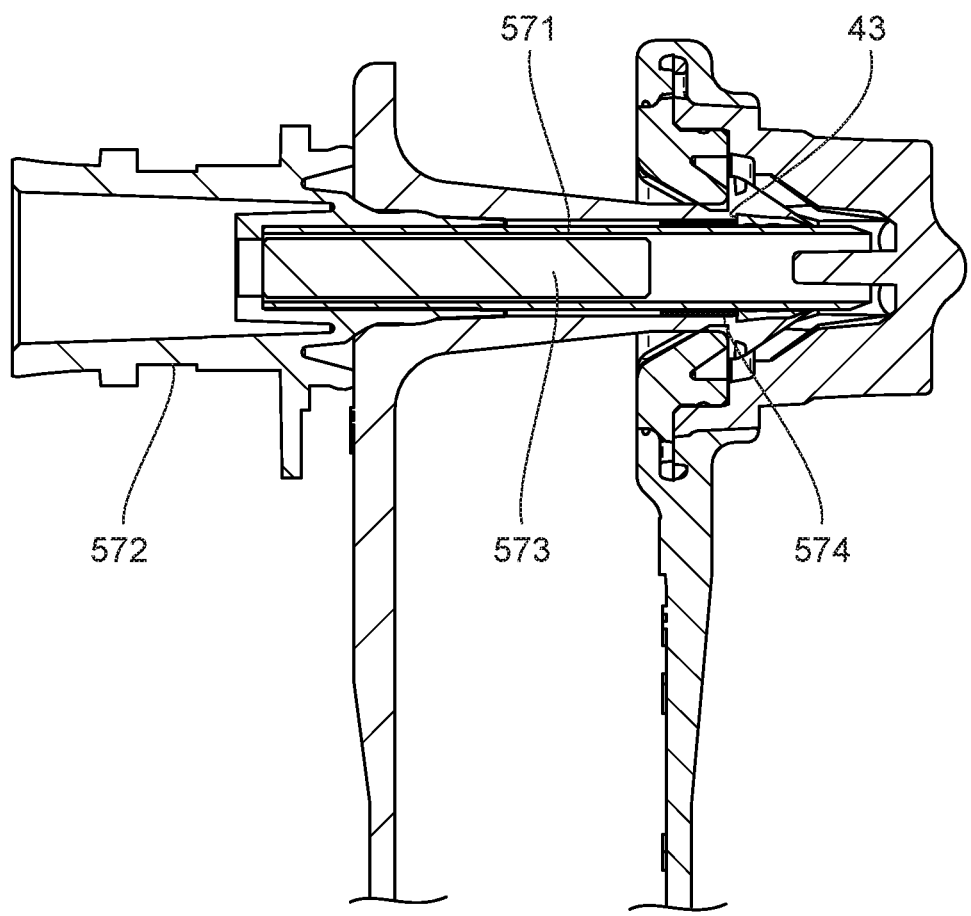

FIGS. 4E to 4F illustrate a second example of a sample-taking member, alone or inserted into the male part 40.

According to this second example, the sampling member comprises:
- a needle 571, of the biopsy needle type;
- an affixing support 572;
- a pusher element 573;
- a bearing element 574.

According to this second example, the bearing element 574 takes the form of a ring fixedly attached to the needle 571. Such a ring can be of varying height (of the order of some microns to some millimeters). It can be a simple wire, a solder bead, a hollow cylinder, etc. Such a ring can also be split all along its height.

For example, such a ring can be held to the needle 571 by bonding, soldering, clipping, etc. If the ring is of the elastic ring type (for example a Circlip®), or a spring ring, it can also be inserted into a groove or a bore-hole formed on the sample-taking member.

Such a bearing element 574 is complementary to the abutment element 43 of the male part. The ring fixedly attached to the needle 571 can thus take support against the insert 425.

In particular, the distance D between the bearing element 574 and the distal extremity of the needle 571 is defined in such a way that the distal extremity of the needle 571 protrudes out of the shaft 42 when the bearing element 574 rests on the abutment element 43.

In this way, the sample-taking member can carry out the operations for cutting out tissue and retaining tissue during the insertion of the locking head 422 into the female part.

It can be noted that the two examples of sample-taking members can also be used with a male part other than the one described with reference to FIGS. 4A to 4C, and especially with a male part that has no insert.

Besides, it can be noted that the bearing element or elements of the sample-taking member and/or the abutment element or elements of the male part do not necessarily have a crown shape. As illustrated in FIG. 1, these elements can include one or more toes, or any other element that can fulfill the bearing/abutment function. According to another example, these elements can take the form of an elastic ring (for example of the Circlip® type) or a spring ring.

It can also be noted that in the embodiments illustrated, the sample-taking member comprises a biopsy needle. As indicated above, it is only an embodiment and other sample-taking elements could be used, such as a thin rod terminating in a tip capable of piercing the tissue for example.

Finally, it can be noted that the base of the male part can take several forms, whatever the embodiment envisaged. For example, this base can take the form of a disk or it can comprise an extension defining a marking surface. Thus, the support can be more or less large-sized depending on the type of animal on which the tag will be placed. This marking surface makes it possible especially to identify the animal through visual identification means taking the form of an inscription in the form of alphabetical, numerical characters or barcodes. Other identification means, such as electronic identification means, can also be planned.

Naturally, the different embodiments are purely given by way of an illustration and are not exhaustive. In particular, it is possible to combine the different embodiments envisaged.

The invention claimed is:

1. A system for identifying animals, wherein the system comprises:
    an identification device for identifying animals; and
    an animal tissue sample-taking member comprising a cutting ridge,
    said identification device comprising a male part comprising a shaft extending from a base and ending in a locking head designed to be inserted into a female part to fixedly attach said identification device to an animal, said shaft being traversed by a longitudinal channel enabling passage of said animal tissue sample-taking member, wherein said shaft comprises at least one abutment element protruding into said channel and forming a bearing surface, which is non-parallel to a longitudinal axis of the longitudinal channel and is located between a middle of said shaft and a distal extremity of said locking head, wherein said shaft has a body made out of a material that is at least partially deformable, wherein said sample-taking member comprises a distal sample-taking extremity and at least one bearing surface which is complementary to said bearing surface of said at least one abutment element of said male part, wherein the at least one bearing surface of the sample taking member contacts the bearing surface of the at least one abutment element such that the sample-taking member stiffens the male part when the sample-taking member is inserted into the longitudinal channel of the male part and a sample of animal tissue is being taken, the distance between said at least one bearing surface of the sample-taking member and the distal sample-taking extremity being defined so that said distal sample-taking extremity projects beyond said shaft of the male part when said at least one bearing surface of the sample-taking member contacts the bearing surface of said at least one abutment element.

2. The system of claim 1, wherein said channel comprises at least two portions having distinct sections, and said at least one abutment element corresponds to a junction area between said portions having distinct sections.

3. The system of claim 2, wherein said distinct sections are cylindrical and concentric.

4. The system of claim 2, wherein the thickness of the material forming the body of said shaft at said portions having distinct sections is substantially constant.

5. The system of claim 4, wherein the distance between said head and said junction area is adapted so that the material forming the body of said shaft at said junction area abuts a base of said female part when the male and female parts are fitted together.

6. The system of claim 1, wherein said head comprises an insert with a hardness greater than that of the material forming the body of said shaft.

7. The system of claim 6, wherein said insert is a truncated cone, a part of the base of which defines said at least one abutment element.

8. The system of claim 6, wherein said insert comprises at least one recess.

9. The system of claim 1, wherein said at least one bearing surface of said sample-taking member is formed by a ring fixedly attached to a needle of said sample-taking member.

10. A system for identifying animals, wherein the system comprises:
an identification device for identifying animals; and
an animal tissue sample-taking member comprising a cutting ridge,
said identification device comprising a female part and a male part, the male part comprising a shaft extending from a base and ending in a locking head designed to be inserted into the female part to fixedly attach said identification device to an animal, said shaft being traversed by a longitudinal channel enabling passage of said animal tissue sample-taking member, wherein said shaft comprises at least one abutment element protruding into said channel and forming a bearing surface, which is non-parallel to a longitudinal axis of the longitudinal channel and is located between a middle of said shaft and a distal extremity of said locking head, wherein said shaft has a body made out of a material that is at least partially deformable, wherein said sample-taking member comprises a distal sample-taking extremity and at least one bearing surface which is complementary to said bearing surface of said at least one abutment element of said male part, wherein the at least one bearing surface of the sample taking member contacts the bearing surface of the at least one abutment element and such that the sample-taking member stiffens the male part when the sample-taking member is inserted into the longitudinal channel of the male part and a sample of animal tissue is being taken, the distance between said at least one bearing surface of the sample-taking member and the distal sample-taking extremity being defined so that said distal sample-taking extremity projects beyond said shaft of the male part when said at least one bearing surface of the sample-taking member contacts the bearing surface of said at least one abutment element.

11. The system of claim 1, wherein said bearing surface of the at least one abutment element is perpendicular to the longitudinal axis of the longitudinal channel.

12. The system of claim 1, wherein the bearing surface of said at least one abutment element and the at least one bearing surface of the sample-taking member are perpendicular to the longitudinal axis of the longitudinal channel.

13. The system of claim 10, wherein said bearing surface of the abutment element is perpendicular to the longitudinal axis of the longitudinal channel.

14. The system of claim 10, wherein the bearing surface of said at least one abutment element and the at least one bearing surface of the sample-taking member are perpendicular to the longitudinal axis of the longitudinal channel.

15. The system of claim 1, wherein the bearing surface of the at least one abutment element is oriented such that contact between the at least one bearing surface of the sample-taking member and the bearing surface of the at least one abutment element transmits a force to the male part at the at least one abutment element, wherein the force has a direction parallel to the longitudinal axis of the channel.

16. The system of claim 10, wherein the bearing surface of the at least one abutment element is oriented such that contact between the at least one bearing surface of the sample-taking member and the bearing surface of the at least one abutment element transmits a force to the male part at the at least one abutment element, wherein the force has a direction parallel to the longitudinal axis of the channel.

* * * * *